United States Patent [19]
Butler

[11] Patent Number: 5,259,475
[45] Date of Patent: Nov. 9, 1993

[54] FRONT WHEEL AND FRONT AND REAR WHEEL STEERING SYSTEM

[75] Inventor: Lee D. Butler, Kingsburg, Calif.

[73] Assignee: FMC Corporation, Chicago, Ill.

[21] Appl. No.: 875,866

[22] Filed: Apr. 29, 1992

[51] Int. Cl.$^5$ ............................................. B62D 5/00
[52] U.S. Cl. ..................................... 180/140; 180/141; 180/234
[58] Field of Search ............... 180/140, 143, 141, 142, 180/234

[56] References Cited
U.S. PATENT DOCUMENTS

| | | |
|---|---|---|
| 4,601,357 | 7/1986 | Miyoshi et al. ............... 180/140 |
| 4,856,606 | 8/1989 | Brown ............................. 180/140 |
| 4,917,204 | 4/1990 | Andrew et al. ................. 180/140 |
| 4,995,472 | 2/1991 | Hayashi et al. ................ 180/234 |

Primary Examiner—Margaret A. Focarino
Assistant Examiner—C. Mattix
Attorney, Agent, or Firm—Michael Lee; R. C. Kamp; R. B. Megley

[57] ABSTRACT

The invention provides a harvester or other such vehicle with front wheel, and front and rear wheel steering. Steering, at various times, is only provided by the front wheels and at other times provided by the front and rear wheels. For four wheel vehicles, this is called two wheel and four wheel steering.

13 Claims, 3 Drawing Sheets

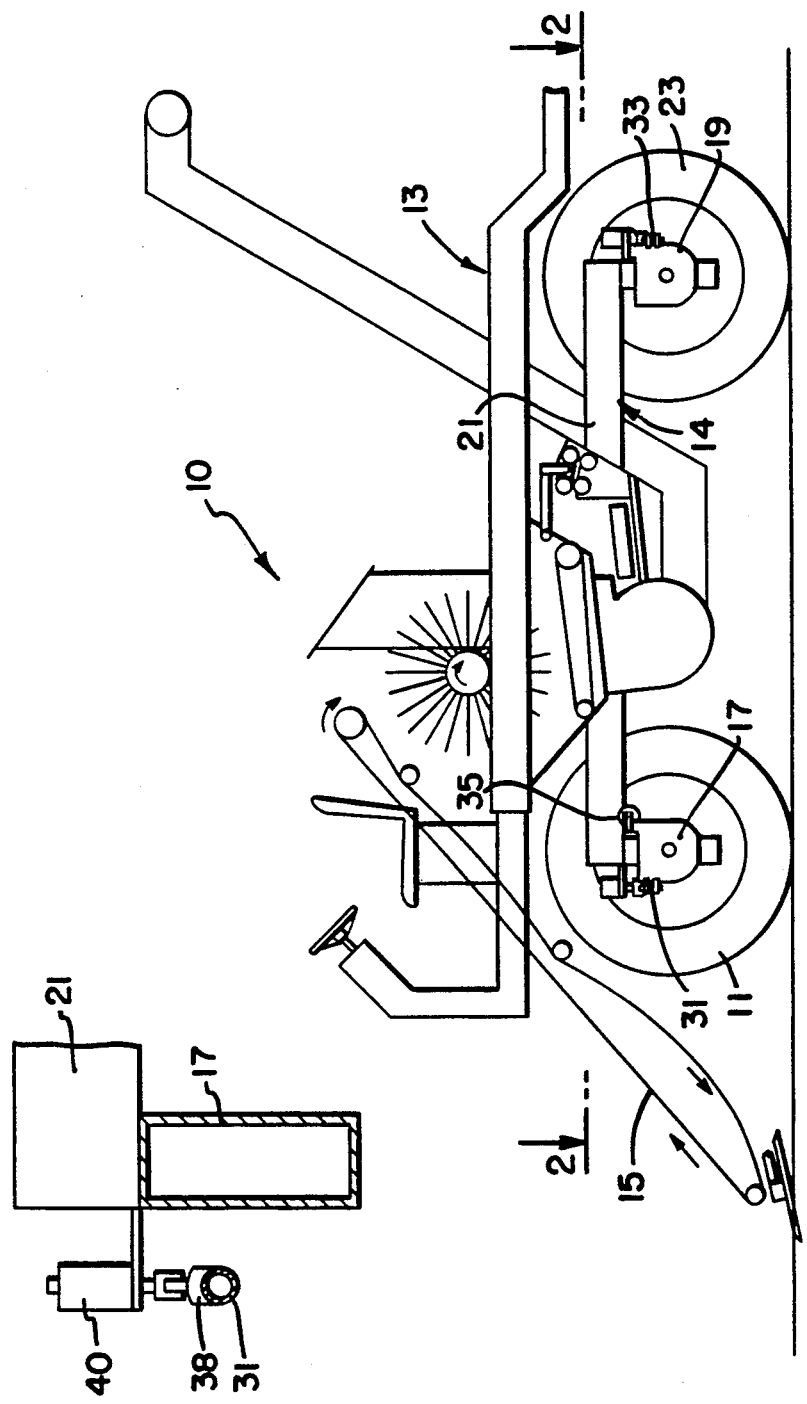

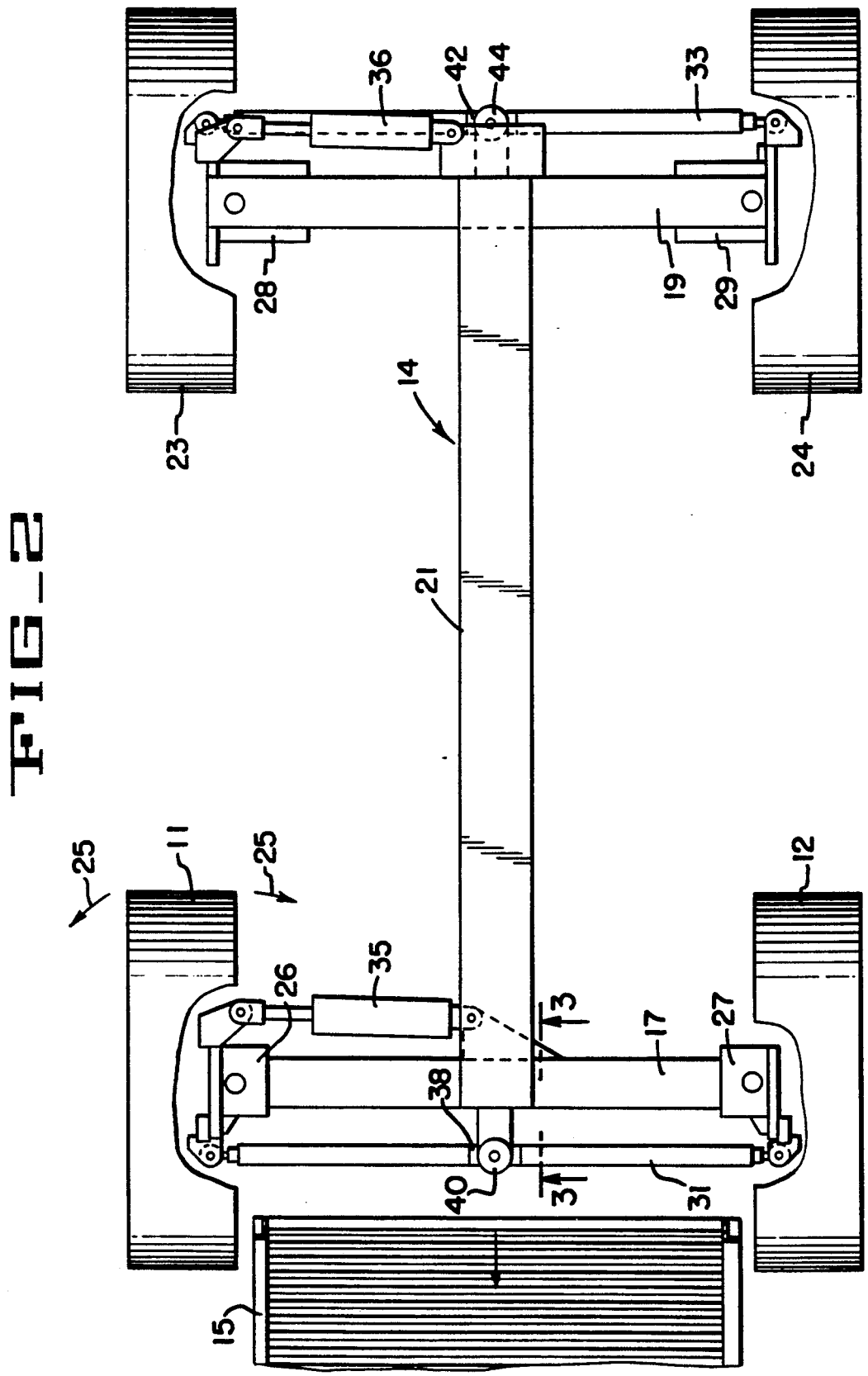

FIG_4
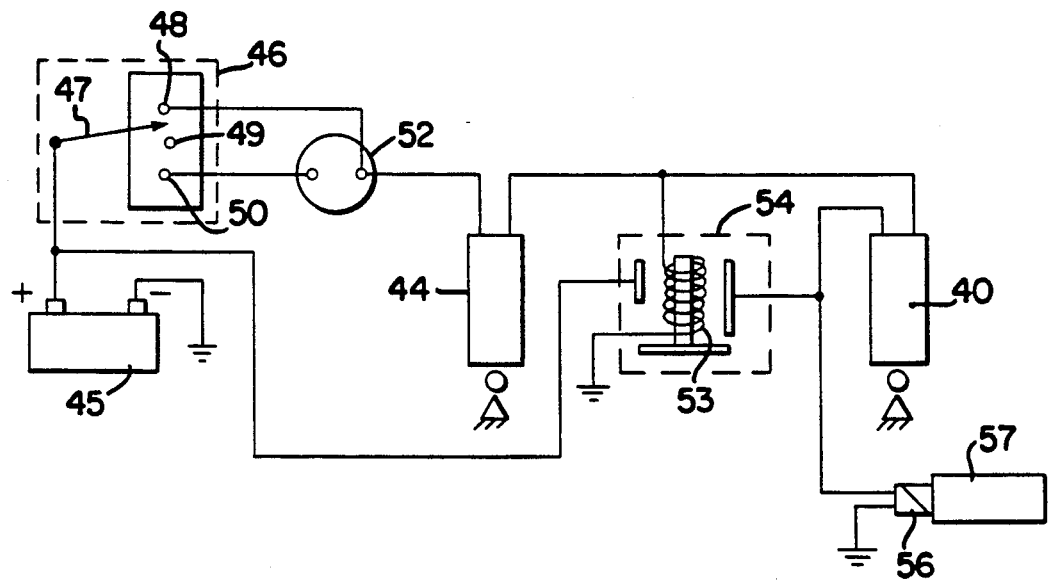
FIG_5
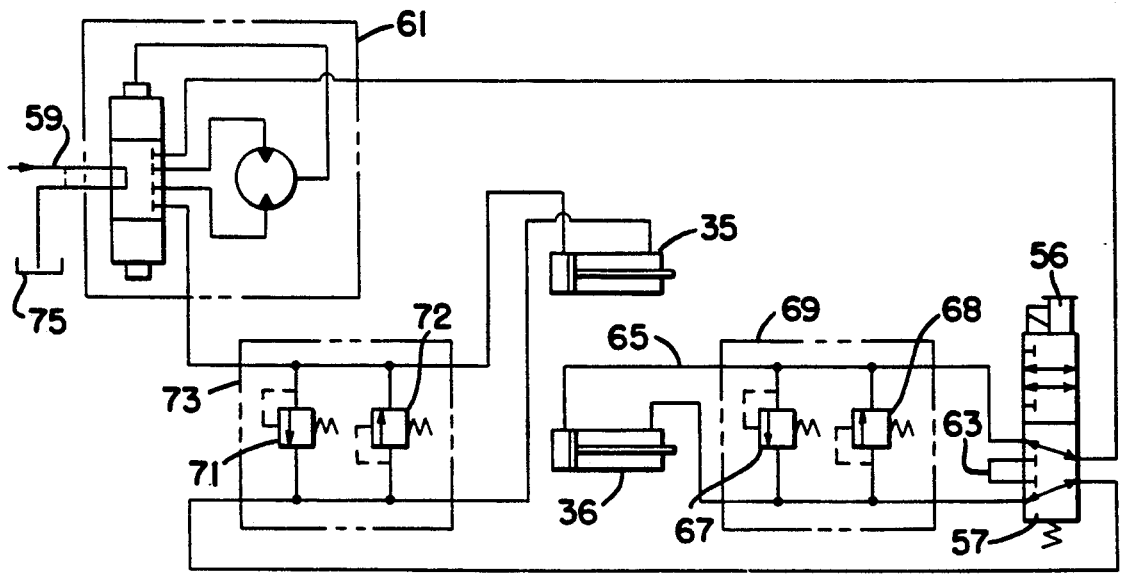

FRONT WHEEL AND FRONT AND REAR WHEEL STEERING SYSTEM

SUMMARY OF THE INVENTION

In vehicles such as tomato and cucumber harvesters, it is desirable to have the vehicle provide front wheel steering some of the time and front and rear wheel steering some of the time. The invention is a control device which provides front wheel and front and rear wheel steering.

BRIEF DESCRIPTION OF THE DRAWINGS

FIG. 1 is a diagrammatic central section of a cucumber harvester, which utilizes a preferred embodiment of the invention.

FIG. 2 is a view of the embodiment illustrated in FIG. 1 viewed along lines 2—2.

FIG. 3 is an enlarged view of the embodiment illustrated in FIG. 2 taken along lines 3—3.

FIG. 4 is a schematic of an electrical control system for providing front wheel and front and rear wheel steering used in the embodiment illustrated in FIG. 1.

FIG. 5 is a schematic of a hydraulic control system for providing front wheel and front and rear wheel steering used in the embodiment illustrated in FIG. 1.

DESCRIPTION OF THE PREFERRED EMBODIMENT

FIG. 1 shows a cucumber harvester. FIG. 2 is a view of the embodiment illustrated in FIG. 1, viewed along lines 2—2, with various parts removed to allow a clearer view of the embodiment of the invention.

The body 13 of the cucumber harvester 10 is mounted on a chassis 14 with a header 15 being attached to the body 13. The body 13 is able to move the header 15 up and down.

On the chassis 14, a front axle 17 extends between a right front wheel 11 and a left front wheel 12. A rear axle 19 extends between a right rear wheel 23 and a left rear wheel 24. The left front wheel 12 and the left rear wheel 24 are not shown in FIG. 1 to allow a clearer view of the embodiment of the invention A central beam 21 extends from the center of the rear axle 19 to the center of the front axle 17. A right front hub 26 is attached between the front axle 17 and the right front wheel 11 in a manner that allows the right front hub 26 and the right front wheel 11 to rotate with respect to the front axle 17 as indicated by arrows 25 to provide steering. A left front hub 27 is attached between the front axle 17 and the left front wheel 12 in a manner that allows the left front hub 27 and the left front wheel 12 to rotate with respect to the front axle 17 to provide steering. A right rear hub 28 is attached between the rear axle 19 and the right rear wheel 23 in a manner that allows the right rear hub 28 and the right rear wheel 23 to rotate with respect to the rear axle 19 to provide steering. A left rear hub 29 is attached between the rear axle 19 and the left rear wheel 24 in a manner that allows the left rear hub 29 and the left rear wheel 24 to rotate with respect to the rear axle 19 to provide steering. A front tie rod 31 is attached between the right front hub 26 and the left front hub 27. A rear tie rod 33 is attached between the right rear hub 28 and the left rear hub 29. A front hydraulic lift 35 is attached between the central beam 21 and the right front hub 26. A rear hydraulic lift 36 is attached between the right rear hub 28 and the central beam 21. Attached to the front tie rod 31 is a front tie rod tab 38, which is illustrated in an enlarged view in FIG. 3. A front micro switch 40 is supported by the central beam 21. Attached to the rear tie rod 33 is a rear tie rod tab 42, which is similar to the front tie rod tab 31. A rear micro switch 44 is supported by the central beam 21. Since the preferred embodiment uses two wheels in the front and two wheels in the rear, the front wheel and front and rear wheel steering in this embodiment may be interchangeably called two wheel and four wheel steering.

FIG. 4 is an electrical schematic of the electrical control circuit of the preferred embodiment of the invention. A battery 45 or some other power source has a negative terminal which is electrically connected to a ground. A positive power lead 47 of a three way switch 46 is electrically connected to a positive terminal of the battery 45. The three way switch 46 has a road connection 48, a standard four wheel steering connection 49, and a field connection 50. The field connection 50 is electrically connected to a first end of a header switch 52, which is normally open when the header 15 is raised and is closed when the header 15 is lowered. A second end of the header switch 52 is electrically connected to a first end of the rear micro switch 44, which is normally open and closes when the rear wheels are straight. A second end of the rear micro switch 44 is electrically connected to a first end of a solenoid 53 for a relay 54 and a first end of the front micro switch 40, which is normally closed and opens when the front wheels are straight. A second end of the front micro switch 40 is connected to a first contact of the relay 54 and a first end of a valve switch 56 for controlling a hydraulic selector valve 57 placing the hydraulic selector valve 57 in a first position or a second position. A second end of the valve switch 56 is electrically connected to the ground. A second contact of the relay 54 is electrically connected to the positive terminal of the battery 45. A second end of the solenoid 53 of the relay is connected to ground. The road connection 48 of the three way switch 46 is electrically connected to the second end of the header switch 52. The standard four wheel steering connection 49 is not electrically connected to the rest of the electrical system.

FIG. 5 is a schematic illustration of part of the hydraulic system used in the preferred embodiment of the invention. A supply provides a positive or negative hydraulic pressure to a supply line 59, which is connected to a steering valve 61. A first outlet of the steering valve 61 is hydraulically connected to a first outlet point for the hydraulic selector valve 57. Hydraulic connections may be provided by joining tubes as shown in FIG. 5 or by other means. Since the hydraulic pressure may be positive or negative, the hydraulic fluid may move in two directions. For this reason the use of the term "outlet" in the specification and claims can mean either an inlet or an outlet, except for the single direction relief valves where the terms "inlet" and "outlet" are used separately. In the first position, the hydraulic selector valve 57 directs fluid from the first outlet point for the hydraulic selector valve 57 to a second outlet point for the hydraulic selector valve 57. In the second position, the hydraulic selector valve 57 directs fluid to a first end of a return tube 63. A first joining tube 65 hydraulically connects the second outlet point for the hydraulic selector valve 57 to a first outlet of the rear hydraulic lift 36, which in this embodiment is a double acting cylinder. The first joining tube 65 is also hydraulically connected to an inlet of a first rear relief valve 67 and an outlet of a second rear relief valve 68, wherein the first and second rear relief valves 67, 68 form a rear cross over relief valve 69. In the second position, the hydraulic selector valve 57 directs fluid from a second end of the return tube to a third outlet point for the hydraulic selector valve 57. A second outlet of the rear hydraulic lift 36 is hydraulically connected to an outlet of the first rear relief valve 67, an inlet of the second rear relief valve 69, and a fourth outlet point for the hydraulic selector valve 57. In the first position the hydraulic selector valve 57 directs fluid from the fourth outlet point for the hydraulic selector valve 57 to the third outlet point for the hydraulic selector valve 57.

The third outlet point for the hydraulic selector valve 57 is hydraulically connected to an outlet of a first front relief valve 71, an inlet of a second front relief valve 72 and a first outlet of the front hydraulic lift 35, which is a double acting cylinder. The first and second front relief valves 71, 72 form a front cross over relief valve 73. A second outlet of the front hydraulic lift 35 is hydraulically connected to an inlet of the first front relief valve, and outlet of the second front relief valve and a second outlet of the steering valve 61. A third outlet of the steering valve 61 is hydraulically connected to a reservoir 75. The hydraulic selector valve 57 provides a mechanical connection between the electrical control system and the rear wheels 23, 24.

In operation, the operator may select road driving by electrically connecting the positive power lead 47 of the switch 46 to the road connection 48. This mode provides for two wheel steering, locking the rear wheels 23, 24 in a straight position, once they are placed in a straight position. If at the moment that road driving is selected, the rear wheels 23, 24 are not in a straight a head position, then the rear micro switch 44 is open. Since the road connection 48 is electrically connected to the second side of the header switch 52, which is electrically connected to the first end of the rear micro switch 44 and the rear micro switch 44 is open, current does not flow from the positive power lead 47 to the valve switch 56. Since there is not a current flowing through the valve switch 56, the hydraulic selector valve is in the first position. In the first position, hydraulic fluid can flow from the steering valve 61, through the hydraulic selector valve 57, through the rear cross over relief valve 69, to the rear hydraulic lift, through the front cross over relief valve 73, through the front hydraulic lift, and back to the steering valve 61. This allows both the front wheels 11, 12 and rear wheels 23, 24 to be turned synchronously for steering providing four wheel steering. When the rear wheels 23, 24 are turned to a straight ahead position, the rear tie rod tab 42 causes the rear micro switch 44 to close. Since the front and rear wheels move synchronously, when the rear wheels 23, 24 become straight the front wheels become straight, so that the front tie rod tab 38 causes the front micro switch 40 to open. Now a circuit flows from the positive power lead 47 through the road connection 48, through the closed rear micro switch 44, through the solenoid causing the relay switch 54 to close establishing an electrical connection between the first contact and the second contact of the relay switch 54. A current flows from the positive terminal of the battery 45, to the first contact of the relay switch 54, to the second contact of the relay switch 54, and through the valve switch 56, causing the hydraulic selector valve 57 to move to the second position. In the second position, hydraulic fluid can flow from the steering valve 61, through the hydraulic selector valve 57, through the return tube 63, through the front cross over relief valve 73, through the front hydraulic lift, and back to the steering valve 61. Since the fluid flows through the return tube 63 and not to the rear hydraulic lift 35 the rear wheels 23, 24 are locked in a straight ahead position.

When the operator changes to four wheel steering from the road selection, the operator moves the positive power lead 47 of the switch 45 from the road connection 48 to the four wheel steering connection 49. Since the vehicle was previously in a mode with the rear wheels locked straight ahead, if the front wheels are not straight ahead, the rear micro switch 44 is closed and the front micro switch 40 is closed and the relay 54 is closed. This causes current to flow from the positive terminal of the battery 45, to the first contact of the relay 54, to the second contact of the relay 54, and through the valve switch 56, which maintains the hydraulic selector valve 57 in the second position, keeping the rear wheels locked. In addition, current flows from the second contact of the relay 54, through the front micro switch 40, and through the solenoid 53 to ground, which keeps the relay 54 closed. When the front wheels 11, 12 are placed straight ahead, the front micro switch 40 opens, breaking the circuit to the solenoid 53, causing the relay 54 to open, which removes the electrical connection between the first contact and the second contact of the relay 54, breaking the circuit to the valve switch 56, causing the hydraulic selector valve 57 to move to the first position, thus unlocking the rear wheels 23, 24. Since both front and rear wheels are straight ahead they move out of that position synchronously and provide four wheel steering. Once out of the straight ahead position, the front micro switch 40 closes and the rear micro switch 44 opens. Since the relay 54 is open, the voltage does not pass through the relay 54 and thus current does not reach the valve switch 56, causing the hydraulic selector valve 57 to stay in the first position, keeping the rear wheels 23, 24 unlocked.

The operator may change from four wheel steering to field conditions with the header 15 up, by moving the positive power lead 47 of the switch 46 from the four wheel steering connection 49 to the field connection 50 and leaving the header 15 up. Since the header 15 is up, the header switch 52 is open. Since the header switch 52 is open, the voltage drop goes from the positive power lead 47 switch, through the field connection 50 to the first end of the header switch 52 and from the positive terminal of the battery 45 to the first contact of the open relay switch 54. Since current does not reach the valve switch 56, the hydraulic selector valve 57 stays in the first position, keeping the rear wheels 23, 24 unlocked. When the vehicle is placed at the end of a row of a cucumber field to begin harvesting the row, the header 15 is lowered, which causes the header switch 52 to close. If the front and rear wheels 11, 12, 23, 24 are not straight ahead, then the rear micro switch 44 is open and the relay switch 54 remains open. Since the rear micro switch 44 and the relay switch 54 are open, current does not flow from the positive power lead 47 to the valve switch 56. Since there is not a current flowing through the valve switch 56, the hydraulic selector valve is in the first position which keeps the rear wheels 23, 24 unlocked. Since the front and rear wheels move synchronously, when the rear wheels 23, 24 become straight the front wheels become straight, so that the front tie rod tab 38 causes the front micro switch 40 to open. Now a circuit flows from the positive power lead 47 of the switch 46 through the field connection 50, through the closed header switch 52, through the closed rear micro switch 44, through the solenoid causing the relay switch 54 to close establishing an electrical connection between the first and the contacts of the relay 54. At this point, a circuit flows from the positive terminal of the battery 45, to the first contact of the relay switch, to the second contact of the closed relay switch 54, and through the valve switch 56, causing the hydraulic selector valve 57 to move to the second position, which locks the rear wheels 23, 24 in a straight ahead position as described above. When the header 15 is raised at the end of the row, the header switch 52 is opened. Since the vehicle has the rear wheels locked straight ahead, if the front wheels are not straight ahead, the rear micro switch 44 is closed and the front micro switch 40 is closed and the relay 54 is closed. This causes current to flow from the positive terminal of the battery 45, to the first contact of the relay 54, to the second contact of the relay 54, and through the valve switch 56, which maintains the hydraulic selector valve 57 in the second position, keeping the rear wheels locked. In addition, current flows from the second contact of the relay 54, through the front micro switch 40, and through the solenoid 53 to ground, which keeps the relay 54 closed. When the front wheels 11, 12 are placed straight ahead, the front micro switch 40 opens, breaking the circuit to the solenoid 53, causing the relay 54 to open, which removes the electrical connection between the first contact and the second contact of the relay 54, breaking the circuit to the valve switch 56, causing the hydraulic selector valve 57 to move to the first position, thus unlocking the rear wheels 23, 24. Since both front and rear wheels are straight ahead they move out of that position synchronously and provide four wheel steering. Once out of the straight ahead position, the front micro switch 40 closes and the rear micro switch 44 opens. Since the relay 54 is open, the voltage does not pass through the relay 54 and thus current does not reach the valve switch 56, causing the hydraulic selector valve 57 to stay in the first position, keeping the rear wheels 23, 24 unlocked.

The preferred embodiment used two wheels in front and two wheels in the rear. Other numbers of wheels may be used, such as a three wheel vehicle. The invention provides a means for providing solely front wheel steering at desired times front and rear wheel steering at various times.

What is claimed is:

1. An apparatus for providing front wheel and front and rear wheel steering for a vehicle, comprising:
   at least one front wheel mounted near the front of the vehicle;
   at least one rear wheel mounted near the rear of the vehicle;
   a mode switch with a first connection for a front wheel steering mode and a second connection for a front and rear wheel steering mode;
   means for moving the front wheel between straight and non straight positions mounted on the vehicle;
   means for moving the rear wheel between straight and non straight positions mounted on the vehicle; and
   means for controlling locking and unlocking of the rear wheel electrically connected to the mode switch and mechanically connected to the rear wheel, wherein the means for controlling prevents the rear wheel from locking if the rear wheel is not straight ahead, prevents the rear wheel from unlocking if the rear wheel is locked and the front wheel is not straight ahead, locks the rear wheel when the mode switch is set for a front wheel steering mode and the rear wheel is straight ahead, and unlocks the rear wheel if the mode switch is set for a front and rear wheel steering and the front wheel is straight ahead.

2. An apparatus, as claimed in claim 1, wherein the means for controlling, comprises:
   means for detecting when the front wheel is straight ahead, mounted on the vehicle;
   means for detecting when the rear wheel is straight ahead, electronically connected to the means for detecting when the front wheel is straight ahead and mounted on the vehicle; and
   means for locking and unlocking the means for moving the rear wheel electrically connected to a first end of the means for detecting when the front wheel is straight mounted on the vehicle.

3. An apparatus, as claimed in claim 2, further comprising a power source and wherein the means for controlling further comprises a relay, which comprises:
   a first contact electrically connected to the power source; and
   a second contact electrically connected to the means for locking and unlocking and the means for detecting when the front wheel is straight; and
   means for electrically connecting the first contact and second contact when there is a voltage drop between the means for detecting when the rear wheel is straight and the means for detecting when the front wheel is straight.

4. An apparatus, as claimed in claim 3, further comprising:
   a header;
   a header switch for indicating whether the header is raised or lowered, wherein the mode switch has a third connection for a field mode electrically connected to a first end of the header switch and wherein a second end of the header switch is electrically connected to a second end of the means for detecting when the rear wheel is straight.

5. An apparatus, as claimed in claim 4, wherein the means for detecting when the rear wheel is straight is a first electrical switch with a first end electrically connected to the second end of the header switch and the first connection of the mode switch, and wherein the means for detecting when the front wheel is straight is a second electrical switch with a first end electrically connected to the second end of the first electrical switch and a second end electrically connected to the means for locking and unlocking and the control means.

6. An apparatus, as claimed in claim 5, wherein the means for electrically connecting the first and second contact comprises a solenoid with a first end electrically connected to the second end of the first electrical switch and the first end of the second electrical switch and a second end electrically connected to ground.

7. An apparatus, as claimed in claim 6, wherein the means for moving the front wheel is a first part of a hydraulic steering system and wherein the means for moving the rear wheel is a second part of the hydraulic steering system, and wherein the means for locking and unlocking is a hydraulic selector valve forming a third part of the hydraulic steering system.

8. An apparatus, as claimed in claim 7, further comprising:
a second rear wheel,
a rear axle extending from the rear wheel to the second rear wheel;
a first hub connecting the rear wheel to a first end of the rear axle;
a second hub connecting the second rear wheel to a second end of the rear axle;
a tie rod extending from the first hub to the second hub; and
a rear switch tab mounted on the tie rod for actuating the first electrical switch.

9. An apparatus, as claimed in claim 8, further comprising:
a second front wheel,
a front axle extending from the front wheel to the second front wheel;
a first hub connecting the front wheel to a first end of the front axle;
a second hub connecting the second front wheel to a second end of the front axle;
a tie rod extending from the first hub to the second hub; and
a front switch tab mounted on the tie rod for actuating the second electrical switch.

10. An apparatus, as claimed in claim 2, further comprising:
a header;
a header switch for indicating whether the header is raised or lowered, wherein the mode switch has a third connection for a field mode electrically connected to a first end of the header switch and wherein a second end of the header switch is electrically connected to a first end of the means for detecting when the rear wheel is straight.

11. A method for providing front wheel and front and rear wheel steering for a vehicle, comprising the steps of:
placing the vehicle in front wheel steering mode, which comprises the steps of;
allowing a rear wheel to turn if the rear wheel is not in a straight ahead position; and
locking the rear wheel in the straight ahead position when the rear wheel reaches the straight ahead position; and
placing the vehicle in front and rear wheel steering, which comprises the steps of:
not unlocking the rear wheel if the rear wheel is locked and a front wheel is not in a straight ahead position; and
unlocking the rear wheel if the rear wheel is locked and if the front wheel is in the straight ahead position.

12. A method, as claimed in claim 11, further comprising the step of placing the vehicle in field mode, which comprises the steps of:
lowering a header;
allowing the rear wheel to turn if the rear wheel is not in a straight ahead position;
locking the rear wheel in the straight ahead position when the rear wheel reaches the straight ahead position;
raising the header;
not unlocking the rear wheel if the rear wheel is locked and the front wheel is not in a straight ahead position; and
unlocking the rear wheel if the rear wheel is locked and if the front wheel is in the straight ahead position.

13. A method, as claimed in claim 12, further comprising the steps of:
detecting whether or not the front wheel is straight ahead;
detecting whether or not the rear wheel is straight ahead; and
detecting whether or not the rear wheel is locked.

* * * * *